(12) United States Patent
Killian (10) Patent No.: US 6,473,426 B1
(45) Date of Patent: *Oct. 29, 2002

(54) TRANSFERRING MESSAGES IN NETWORKS MADE UP OF SUBNETWORKS WITH DIFFERENT NAMESPACES

(75) Inventor: Thomas Joseph Killian, Westfield, NJ (US)

(73) Assignee: AT&T Corp., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/357,893

(22) Filed: Jul. 21, 1999

Related U.S. Application Data (63) Continuation of application No. 08/694,076, filed on Aug. 8, 1996, now Pat. No. 5,940,394.

(51) Int. Cl.[7] .............................................. H04L 12/28
(52) U.S. Cl. ...................... 370/393; 370/465; 370/474; 370/401; 709/249
(58) Field of Search ................................. 370/351, 352, 370/252, 389, 390–392, 393, 396, 401–407, 463, 465, 474; 709/249, 223, 224, 238

(56) References Cited

U.S. PATENT DOCUMENTS

| | | | |
|---|---|---|---|
| 4,897,841 A | 1/1990 | Gang, Jr. | 370/401 |
| 5,347,304 A | 9/1994 | Moura et al. | 370/463 |
| 5,390,173 A | 2/1995 | Spinny et al. | 370/401 |
| 5,432,907 A | 7/1995 | Picazo, Jr. et al. | 370/401 |
| 5,444,782 A | 8/1995 | Adams, Jr. et al. | 713/153 |
| 5,450,407 A | 9/1995 | Perlman et al. | 370/392 |
| 5,471,472 A | 11/1995 | McClure et al. | 370/402 |
| 5,740,374 A | 4/1998 | Raffali-Schreinemachers | 370/392 |
| 5,781,529 A | 7/1998 | Liang et al. | 370/218 |

FOREIGN PATENT DOCUMENTS

| | | |
|---|---|---|
| EP | 0 700 231 A | 3/1996 |
| WO | WO 96/21983 | 7/1996 |

OTHER PUBLICATIONS

"IP in IP Tunneling", W. Simpson, Network Working Group, Request for Comments: 1853, Category: Informational, Oct. 1995, pp. 1–8.

"Blacker Interface Control Document", Mar. 21, 1989, pp. 1 1—1–2, 2–1—2–11, 3–1—3–4, A–1, B–1, C–1—C–2.

(List continued on next page.)

*Primary Examiner*—Seema S. Rao

(57) ABSTRACT

Techniques employed in packet networks for transferring a packet across subnetworks with different namespaces. When a packet enters a given subnetwork and has a destination in a subnetwork with a different namespace, the given subnetwork encapsulates the packet by adding a header which specifies a decapsulator in the namespace. When the packet arrives at the decapsulator, the decapsulator strips the header and provides the packet to a subnetwork with a different namespace. A particular use of the technique is in a network used for broad-band interactive service. The network has two sub-networks. The first subnetwork is a TV channel which functions as a high-bandwidth forward channel and the second subnetwork is a packet network accessible via a public modem pool which functions as a lower-bandwidth return channel. The encapsulator establishes a connection with the public modem pool and receives an address in the second subnetwork which is temporarily associated with the connection. When the encapsulator receives a packet which is produced in response to a packet received from the TV channel and has a destination address in the sub-network of the TV channel, the encapsulator places a header on it which contains the temporary address and the address of the decapsulator. When the packet arrives at the decapsulator, the decapsulator removes the header and provides the packet to the second sub-network.

8 Claims, 10 Drawing Sheets

OTHER PUBLICATIONS

"Pseudo–Network Drivers and Virtual Networks", S.M. Bellovin, Usenix Confrence Proceedings, Washington, D.C., Jan. 22–26, 1990, pp. 229–244.

"Cisco PIX Firewall", Data Sheet, Cisco Systems, Jul. 23, 1996, 4 pages.

"PIX Private Link", Data Sheet, Cisco Systems, Jul. 23, 1996, 2 pages.

L. Svobodova, P.A. Janson, and E. Mumprecht, "Heterogeneity and OSI," *IEEE Jounral on Selected Areas in Communications*, vol. 8, No. 1, Jan. 1990, pp. 67–79.

N. Demizu and S. Yamaguchi, "DDT—A versatile tunneling technology," *Computer Networks and ISDN Systems*, vol. 27, No. 3, Dec. 1994, pp. 493–502.

S. M. Bellovin and W. R. Cheswick, "Network Firewalls," *IEEE Communications Magaizne*, vol. 32, No. 9, Sep. 1994, pp. 50–57.

THE FIELDS ARE AS FOLLOWS:

501 — VERSION = 4
503 — IHL (HEADER LENGTH) = 5
505 — TYPE OF SERVICE: COPIED FROM USER'S PACKET
507 — TOTAL LENGTH: SIZE OF USER'S PACKET + 20
509 — IDENTIFICATION: NEW SEQUENCE NUMBER GENERATED

511 {
  FLAGS (BIT 0) = 0
  FLAGS (BIT 1): 'Don't Fragment' COPIED FROM USER'S PACKET
  FLAGS (BIT 2): 'More Fragments' SET AS NEEDED
}

515 — TIME TO LIVE = 255
517 — PROTOCOL = 4 (IP IN IP ENCAPSULATION)
519 — SOURCE: DIALUP ADDRESS
521 — DESTINATON: DECAPSULATOR ADDRESS

```
hyb# cat decap.c                                          1001
#define __BSD_SOURCE
#define n_long long
        /* ^^^ it is really dumb that i have to do that */ include <stdio.h>
include <errno.h>
#include <sys/types.h>
#include <sys/socket.h>
#include <netinet/in.h>
include <netinet/ip.h> int main()
{
        int c;
        FILE *fc;
        int n;
        int yes;
        int sockfd;
        char s[4096];
        struct ip *iph;
        struct sockaddr_in sa;

sa.sin_family = AF_INET;
        sa.sin_port = htons(1492);
        sa.sin_addr.s_addr = htons(0);

if ((sockfd = socket(AF_INET, SOCK_RAW, 255)) < 0) {
                /* printf("couldn't get socket %d\n", errno); */
                exit(1);
        } yes = 1;
        setsockopt(sockfd, IPPROTO_IP, IP_OPTIONS, NULL, 0);    ⎫
        setsockopt(sockfd, IPPROTO_IP, 3, &yes, sizeof(yes));   ⎬ 1003
        while((n = read(0, s, 4096)) > 0) {                     ⎭
                iph = (struct ip *) s;
         1007   sa.sin_addr = iph->ip_dst;
                yes = sendto(sockfd, s, n, 0, (struct sockaddr *) &sa, sizeof(sa));
                printf("%d: %d %rI SENT A PACKET ALL BY MYSELF!\n", yes, errno); */
        )
/*
)
hyb#
```

1005 points to the while block; 1007 points to iph assignment.

TRANSFERRING MESSAGES IN NETWORKS MADE UP OF SUBNETWORKS WITH DIFFERENT NAMESPACES

This is a Continuation of application Ser. No. 08/694,076 filed Aug. 8, 1996 which issued as U.S. Pat. No. 5,940,394.

BACKGROUND OF THE INVENTION

1. Field of the Invention

The invention concerns transferring messages via networks generally and more particularly concerns transferring messages via networks in which there are subnetworks with different namespaces. An important area of application of the invention is high-bandwidth interactive services which use independent forward and return channels having different bandwidths.

2. Description of the Prior Art

An important problem in telecommunications is providing high-bandwidth interactive services to sites which do not have high-bandwidth two-way connections. An example of such a site is the average residential dwelling. A residential dwelling typically has two connections by which it may exchange data with the rest of the world. One of these is a connection to a cable TV (CATV) network. The other is a standard twisted pair telephone line. The CATV connections has high bandwidth, but may be used only to receive data, not send it. In the terminology used in this patent application, the CATV connection provides only a forward channel. The telephone line may be used to both send and receive data, and thus provides both a return channel and a forward channel, but both channels have low bandwidth.

Those who have studied the problem of providing high-bandwidth interactive services have noted that in many cases, the bandwidth required for the interaction is asymmetrical. One example is surfing the World Wide Web. The surfer sends the address of a Web page; the page is downloaded to the surfer's computer; then the surfer responds with the address of another web page, and so forth. Another example is telecommuting. There are many jobs in which the worker examines a document and does something with it such as modifying it, making a comment, or sending it to someone else and then gets the next document. In most cases, the amount of information output by the worker when he/she works on the document is much smaller than the amount of information contained in the document itself. Thus, what both the Web surfer and the telecommuter need is a high bandwidth forward channel upon which he/she can receive the web pages or documents to be examined and a low-bandwidth return channel for the information that he/she is outputting.

Figure 1:
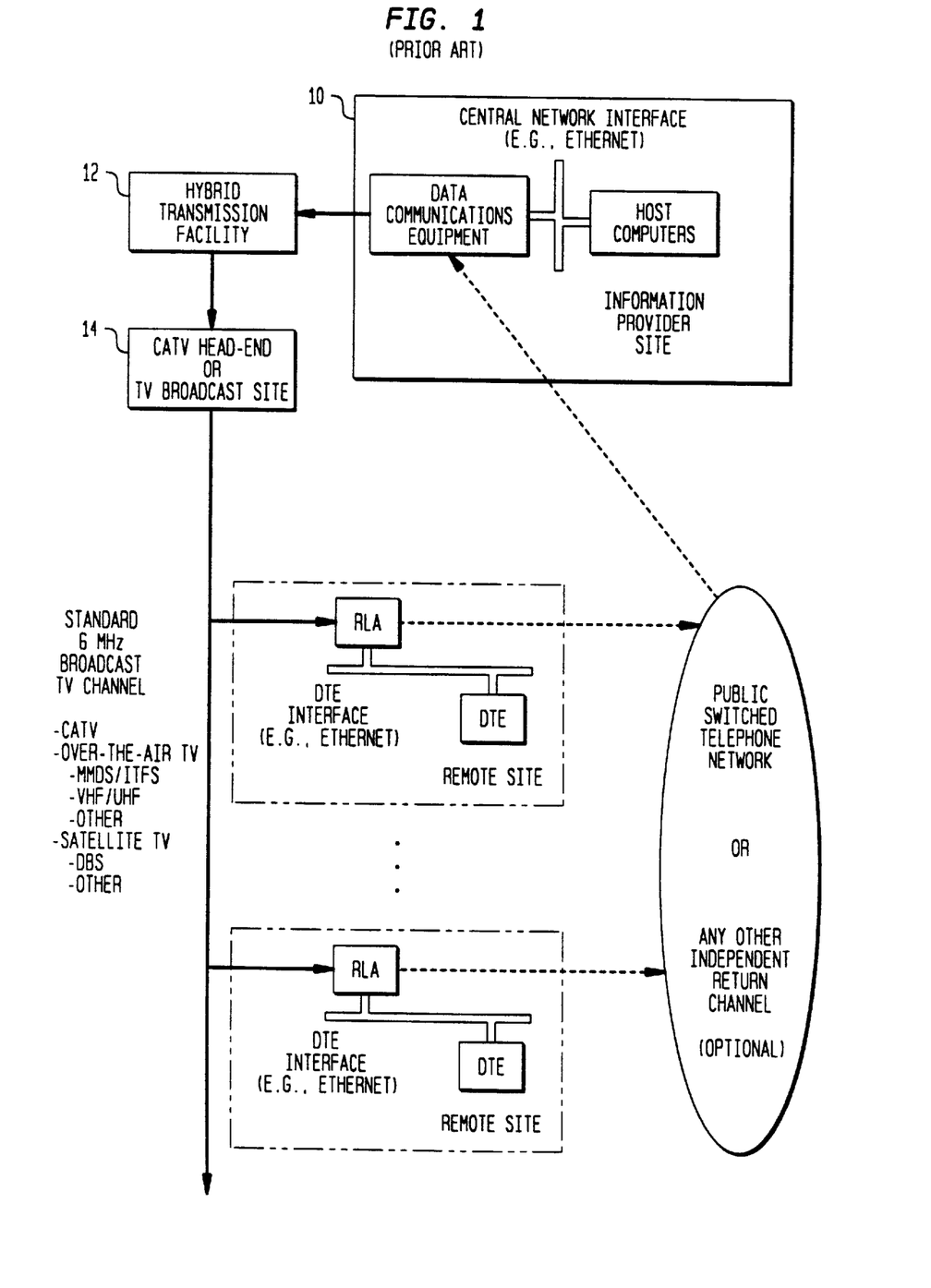
FIG. 1 shows the prior-art system of Moura. It is a copy of FIG. 1 of the Moura patent.
Figure 2:
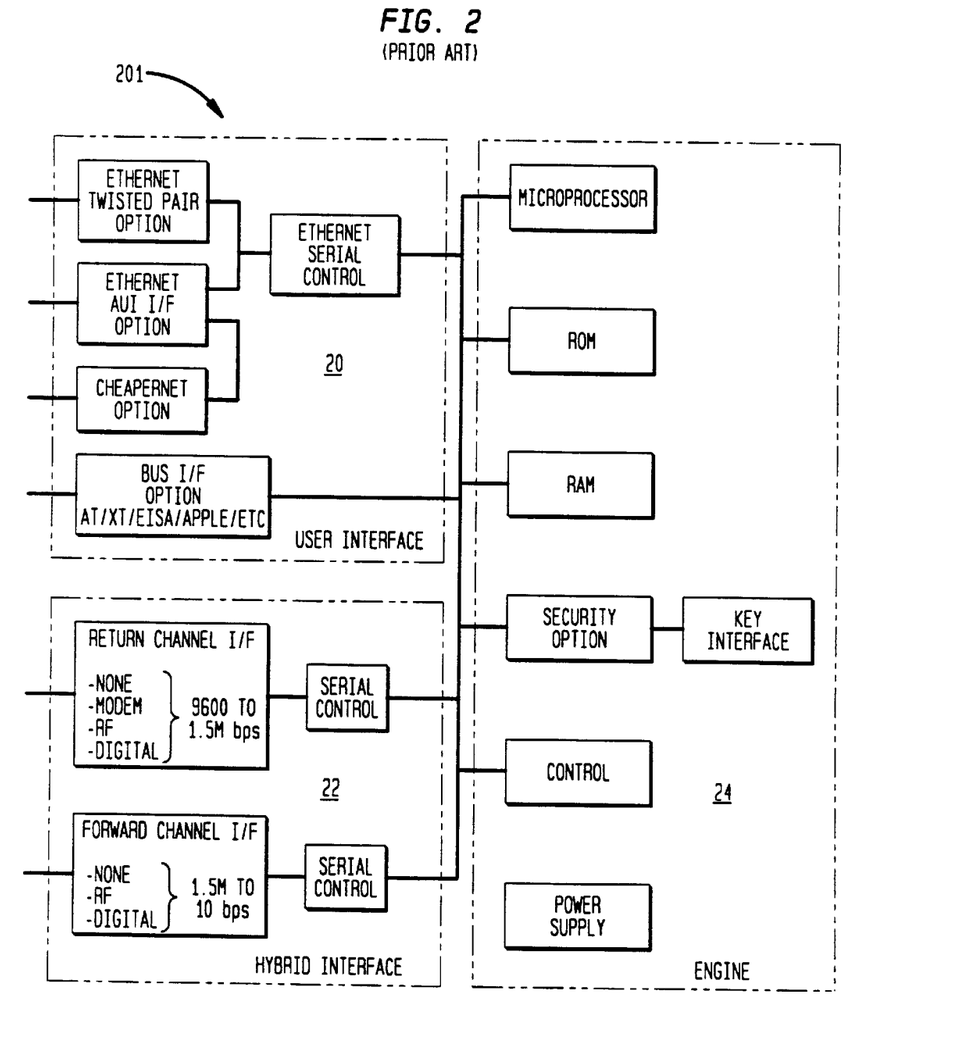
FIG. 2 is a detail of Moura's Remote Link Adapter. It is a copy of FIG. 2 of the Moura patent.

A system for providing interactive services that have a high-bandwidth forward channel and a low-bandwidth return channel to residential dwellings is described in Moura, et al, U.S. Pat. No. 5,347,304, Remote Link Adapter for use in TV Broadcast Data Transmission System, issued Sep. 13, 1994. That entire patent is hereby incorporated by reference into the present patent application. FIGS. 1 and 2 of the present patent application are copies of the corresponding FIGS. of the Moura patent. As shown in FIG. 1, the system of Moura uses a CATV or broadcast TV channel as the high-bandwidth forward channel and has an independent low-bandwidth return channel. The return channel may be a circuit in the public switched telephone network or any other channel which is independent of the forward channel. Information provider site 10 and each of the remote sites has an address in the network formed by the forward channel, the return channel, the information provider site, and the remote sites.

The data in the forward channel comes from host computers in information provider site 10; the data communications equipment makes packets containing the data. Each packet includes a message which contains the data and a header. The header contains at least the address of the source of the message and the address of the destination of the message. In this case, the source address is the address of information provider site 10 and the destination address is the address of one of the remote sites. The packet goes from data communications equipment to hybrid transmission facility 10, which employs a radio frequency modem to convert the digital packet into a form proper for its transmission over the TV channel and provides it to head end or broadcast site 14. At each remote site, a remote link adapter (RLA) which includes another radio frequency modem watches the TV channel for packets addressed to its remote site. When it detects such a packet, it converts the packet into a form proper for its transmission over the network connecting data terminal equipment (DTE) such as a personal computer and the RLA and provides the packet to the DTE. As can be seen from the foregoing, the forward channel is in fact a packet network, and will be termed in the following a forward packet network.

When the user of the DTE responds to the data that has been sent him/her via the forward packet network, the response goes to the RLA, which sends it via the telephone line in the user's dwelling and the public switched telephone network data communications equipment at information provider 10, which in turn provides the response to the host computers at information provider site 10.

The Moura patent provides substantially no disclosure about the return channel. One particularly useful form of return channel is a packet network. Such a return channel is termed in the following a return packet network. When the return channel is a return packet network, the packets that contain the response must include a header with the address of the remote site as a source address and the address of the data provider as a destination address. This is all straightforward enough, but it necessarily assumes that the forward packet network and the return packet network have the same set of addresses. If they do not, the addresses necessary to communicate with sources and destinations in the forward packet network must be added to the return packet network.

Adding addresses may be difficult for several reasons:
  if there is a large number of provider sites and remote sites, a substantial increase in the size of the return packet network's address data bases will be required;
  a considerable time must be spent updating the return packet network's address data bases with the new names; and
  the return packet network's address data bases must track changes in remote sites and data provider sites in the forward packet network.

These problems are particularly difficult if the return packet network is not under control of the entity that controls the forward packet network. Precisely that is the case when a public packet network such as those made available by internet access providers is used as the return packet network. Using such a public packet network as the return packet network in the system of Mourra is however particularly advantageous, first, because the necessary infrastructure already exists, and second because the competition of the public packet networks for traffic reduces the cost of the return channel to the user.

The need to add addresses to the return packet network is a specific example of a general problem with packet networks: each packet network has a namespace, that is, a set of addresses that it recognizes as sources of or destinations for packets. If a packet network receives a packet whose source or destination address is not part of the namespace of the network, the message is not forwarded. Because that is the case, a packet network cannot include subnetworks (such as the forward packet network and return packet network in the implementation of Moura described above) that have different namespaces. When a packet which originated in a first subnetwork with a first namespace enters a second subnetwork with a second namespace, the second subnetwork will reject the packet. Consequently, a packet with source and destination names from a subnetwork having a first namespace cannot be sent via a subnetwork having a second namespace. As described above, the only way of presently solving this problem is to add the source and destination addresses to the second namespace.

It is an object of the invention disclosed herein to provide techniques for sending a packet via a path that crosses packet subnetworks with different namespaces.

SUMMARY OF THE INVENTION

The object of the invention may be attained by the following method:

when the packet enters a given one of the subnetworks and a current header of the packet does not specify a destination in the given one of the subnetworks, adding a new header to the packet and treating the new header as the current header, the new header specifying an exit destination where packets transferred via the path enter another one of the subnetworks;

sending the packet to the destination specified in the current header; and if the packet arrives at the exit destination, removing current header and providing the packet to the other subnetwork.

The portion of the method which adds the new header is termed encapsulation, and may be performed in apparatus called an encapsulator. The portion of the method which removes the current header is termed decapsulation and may be performed in apparatus called a decapsulator.

One application of the technique is in packet networks having a first subnetwork as a forward channel and a second subnetwork as a return channel. The encapsulator receives packets with addresses in the first subnetwork, appends the new header with the address of the decapsulator in the second subnetwork, and provides the packet to the second subnetwork. The second subnetwork sends the packet to the decapsulator, which removes the new header and provides the packet to the first subnetwork.

In a particular application of the technique, the forward channel is a TV channel and the return channel is a packet network to which access may be had by means of a public modem pool. When a user is accessing the packet network by means of a modem in the public modem pool, a temporary address in the packet network is associated with the modem. In this application, the encapsulator has a connection of a modem in the public modem pool, and has received the temporary address associated with the modem. The header added by the encapsulator includes the temporary address and the address of the decapsulator. The encapsulator may receive the address of the decapsulator via either the first packet network or the second packet network.

Other objects and advantages of the apparatus and methods disclosed herein will be apparent to those of ordinary skill in the art upon perusal of the following Drawing and Detailed Description, wherein:

Reference numbers in FIGS. 1 and 2 have two digits; the reference numbers in FIGS. 3–9 have three digits: the two least-significant digits are the number of an item in a figure; the remaining digits are the number of the figure in which the item first appears. Thus, an item with the reference number 301 first appears in FIG. 3.

DETAILED DESCRIPTION OF A PREFERRED EMBODIMENT

The following Detailed Description begins with a description of a technique called internet protocol tunneling, which is related to the technique used in the present invention to permit a message from a source in a first namespace to be transferred via a second namespace to a destination in the first namespace. Then a conceptual overview of the invention will be presented, followed by a description of an embodiment of the invention which serves as the return channel in the system of Moura.

Internet Protocol Tunneling

Internet protocol tunneling is a technique which has long been used in the Internet to bridge portions of the Internet which have disjoint capabilities or policies. For instance, some portions of the Internet are surrounded by firewalls, that is, packets passing from the outside the portion surrounded by the firewall to inside the portion and vice-versa are checked to determine whether they are authorized, and are allowed inside the portion only if they are. Tunneling may be used to permit packets that are not authorized to enter the portion surrounded by the firewall to to pass through the portion without interacting with anything inside the portion.

The actual tunneling protocol used to implement the invention is described in W. Simpson, *IP in IP Tunnelling*, Network Working Group Request for Comments: 1853, October, 1995. As set forth in the above reference, tunneling is done as follows: in the network node that marks the beginning of the portion of the network that is to be tunneled through, an encapsulator implemented in the node adds an outer header to the packet whose source address is that of the encapsulator and whose destination address in that of a decapsulator in a node that marks the end of the portion of the network that is to be tunnelled through. The portion of the network being tunnelled through reads only the outer header and simply sends the packet to the decapsulator. The decapsulator removes the outer header and provides the original packet to the next portion of the network. The outer header thus encapsulates the original packet as it passes through the tunnel. Of course, it may turn out that while a packet is in one tunnel, it must pass through another tunnel. In that situation, the encapsulator for the new tunnel simply places a new outer header at the head of the packet, and the decapsulator for the new tunnel removes the new outer header when the end of the new tunnel is reached. There is of course no limit to the number of times this technique may be repeated.

Figure 3:
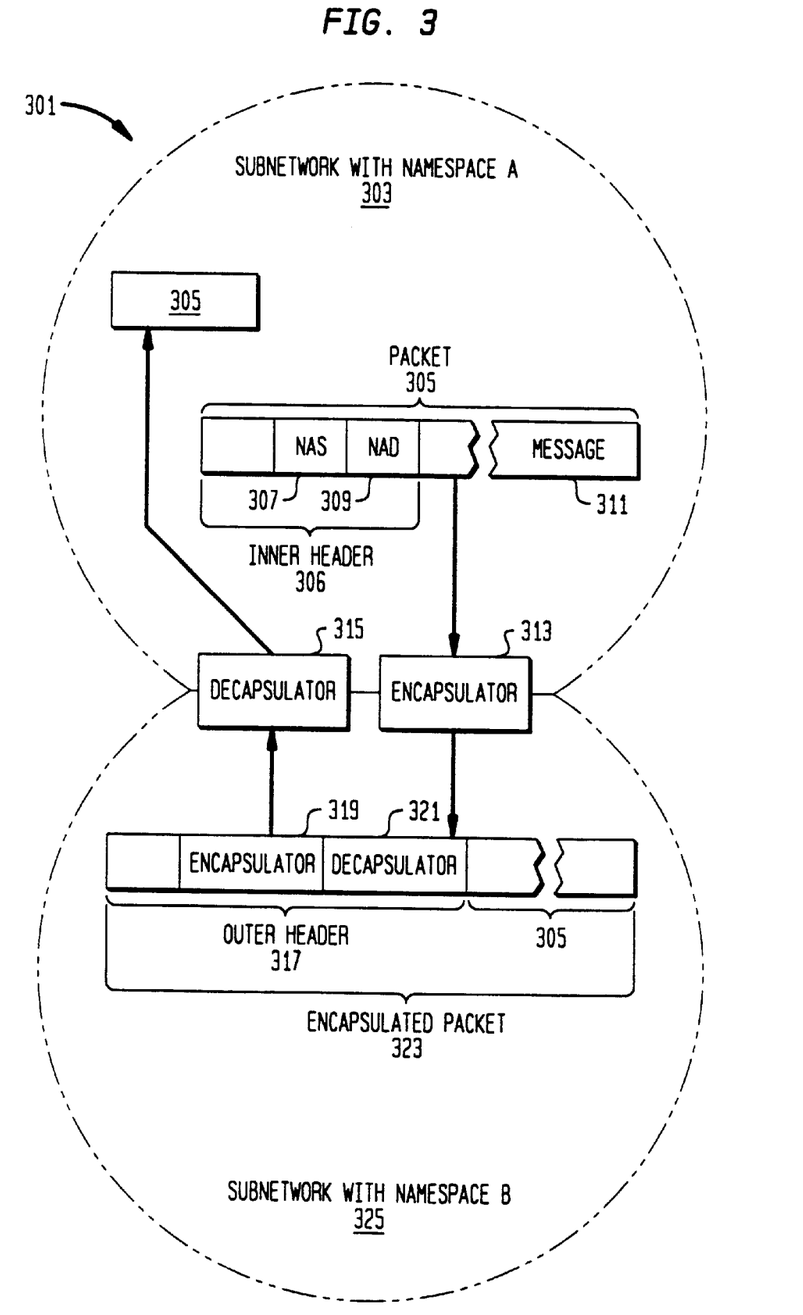
FIG. 3 is a conceptual view of the invention.

Using Tunneling to Route a Packet through a Subnetwork with a Different Namespace: FIG. 3

In the present invention, the technique of tunneling is put to a new use: namely to route a packet through subnetworks that have different namespaces than the one to which the source and destination addresses in the packet's original header belong. The new use, termed herein namespace tunneling, is shown in FIG. 3. There, a network 301 is shown which has a subnetwork 303 with namespace A and a subnetwork 325 with namespace B. A packet 305 with a source whose address belongs to namespace A must travel via subnetwork 325 to a destination whose address belongs to namespace A. Packet 305 has message 311 and inner header 306 which contains subnetwork A source address (NAS) 307 and subnetwork A destination address (NAD) 309. Since packet 305 must travel via subnetwork B, a router in subnetwork A sends packet 305 to encapsulator 313, which may receive packets from subnetwork A and provide them to subnetwork B. Encapsulator 313 has in its memory its own address in subnetwork B and the address of decapsulator 315 in subnetwork B, as well as any other information needed to properly construct an outer header. Encapsulator 313 receives packet 305 and adds to it outer header 317, which includes at least the address in subnetwork B of encapsulator 313 as the source address and the address in subnetwork B of decapsulator 315 as the destination address. Encapsulated packet 323 is now sent by subnetwork B to decapsulator 315, which has access to subnetwork A. Decapsulator 315 simply removes outer header 317 and delivers packet 305 to subnetwork A, which in turn delivers the packet to the destination specified in NAD field 309.

Figure 6:
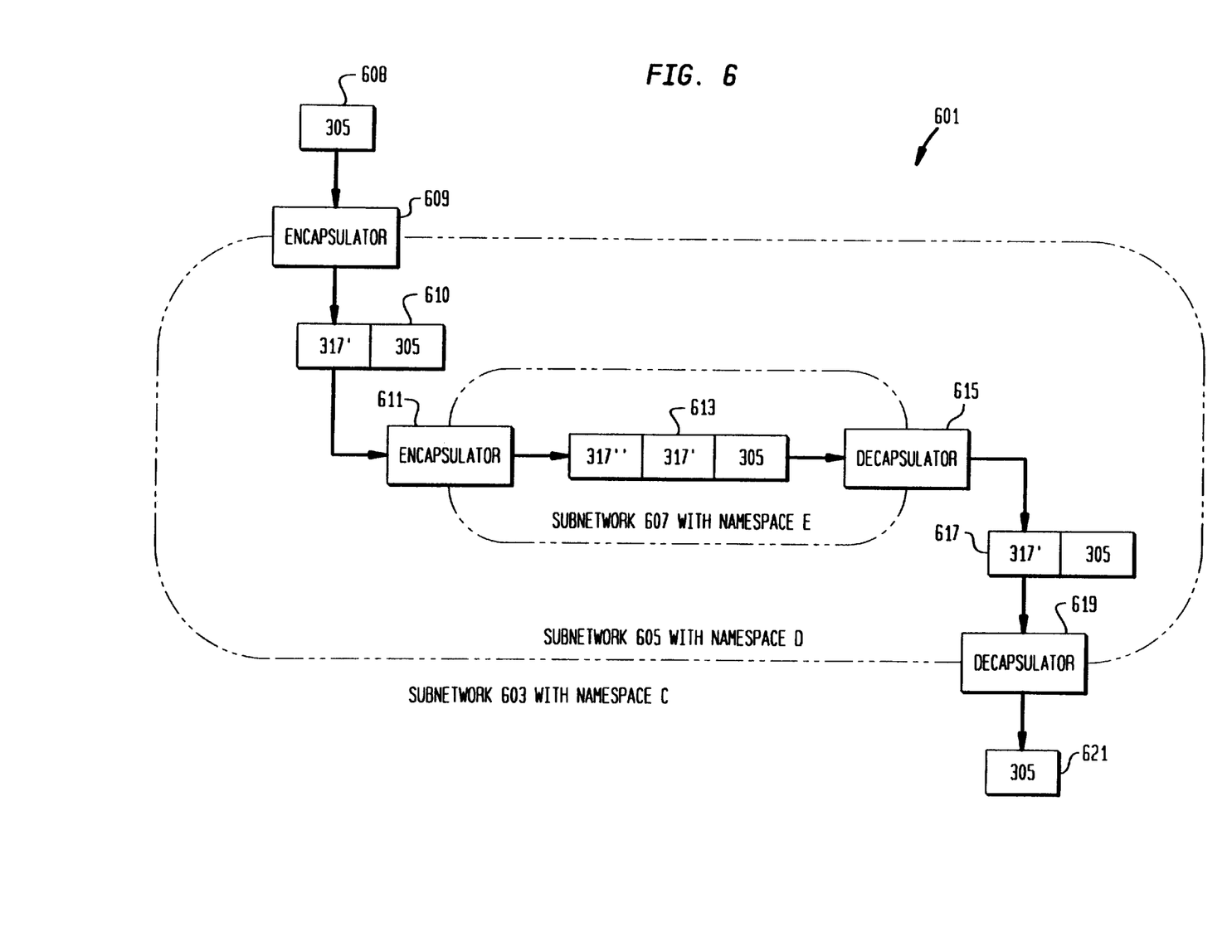
FIG. 6 is a diagram of subnetworks with nested namespaces.
Figure 7:
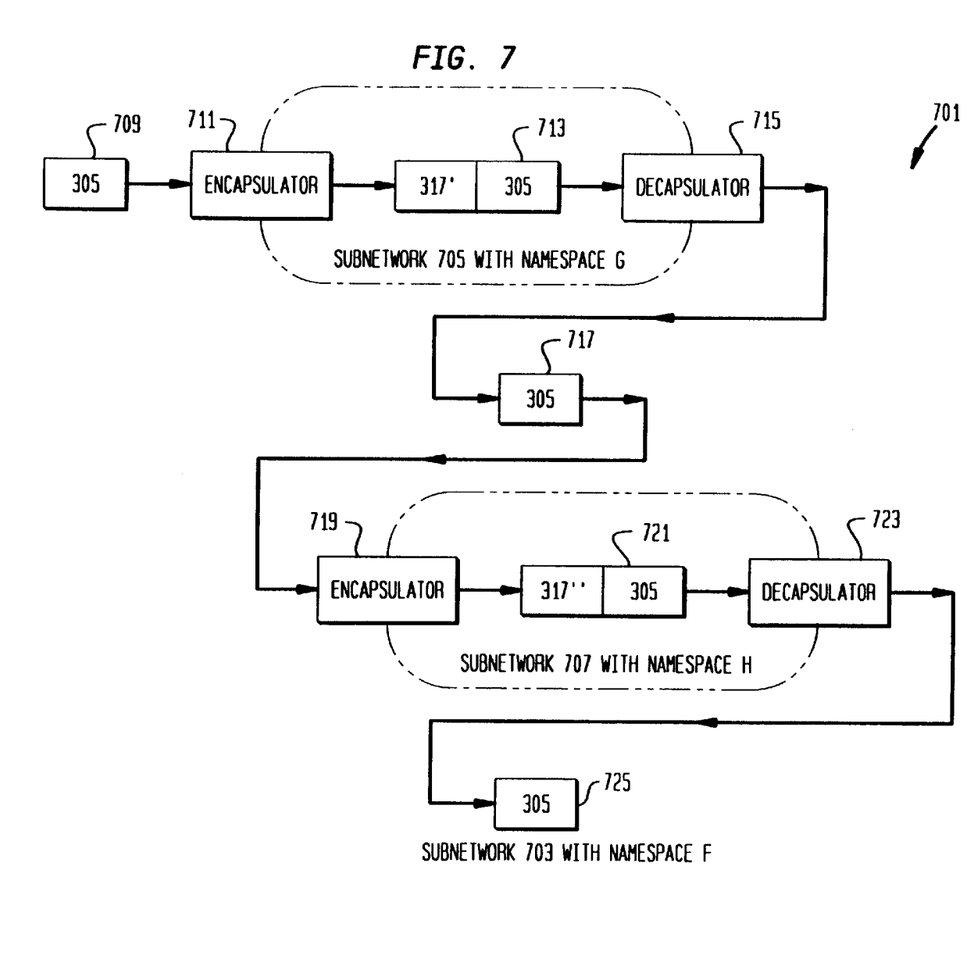
FIG. 7 is a diagram of subnetworks with namespaces that are not nested.
Figure 8:
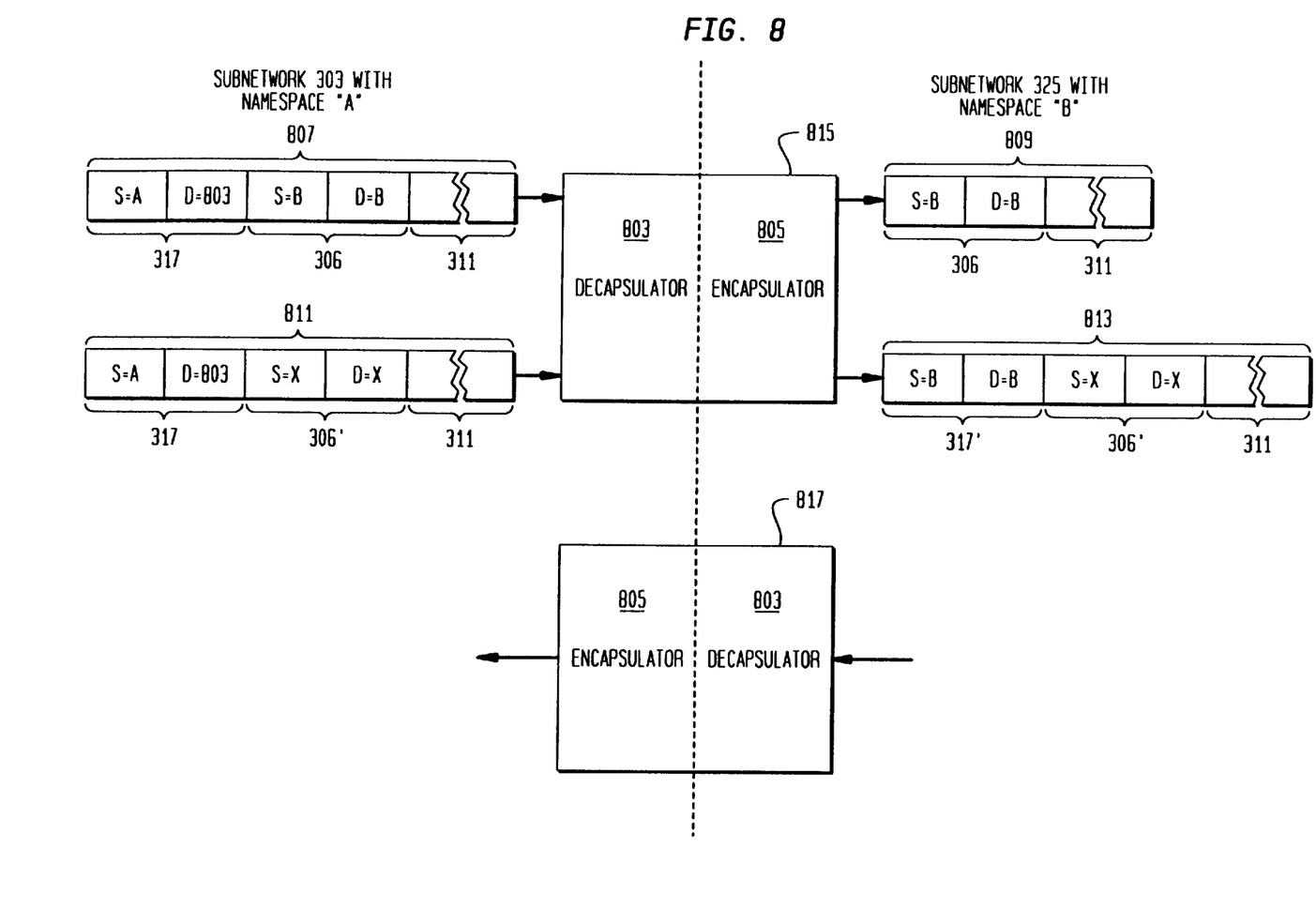
FIG. 8 is a diagram of entry points encorporating the principles of the invention.

Namespace Tunneling with more than one Subnetwork Having a Different Address Space: FIGS. 6–8

Of course, namespace tunneling may be used where the packet is transferred through more than one namespace. In describing tunneling in this case, it is useful to define the concept of a packet's path through the namespaces. For purposes of the present discussion, the path of a packet is simply the order in which the packet encounters the namespaces. There are two kinds of orders: nested order and sequential order.

FIG. 6 shows a path with nested order. There are three namespaces C, belonging to subnetwork 603, D, belonging to subnetwork 605, and E, belonging to subnetwork 607. Packet 305 starts in namespace C, enters namespace D, then enters namespace E, then enters D again, and finally C again. The path is C,D,E,D,C. Before packet 305 enters namespace D, it has the form shown at 608; Subnetwork 603 routes it to encapsulator 609, which makes packet 610 by adding an outer header 317'. Outer header 317' includes the address of decapsulator 619. Subnetwork 605 routes the packet to subnetwork 607, which makes packet 613 by adding another outer header 317", which contains as its destination address the address of decapsulator 615. When decapsulator 615 receives packet 613, it removes outer header 317" to produce packet 617, which, as specified in outer header 317', is routed by subnetwork 605 to decapsulator 619, which removes outer header 317' to produce packet 621 in subnetwork 603, which of course contains inner header 306 of the original packet 608. As will be immediately apparent, the nesting of address spaces may be to any practical depth. As will also be immediately apparent, when a namespace is nested in another namespace, any path out of the subnetwork to which the nested namespace belongs must enter the other namespace, and consequently, the nested namespace requires only one decapsulator 619.

In the other, shown in FIG. 7, the path taken by packet 709 again enters three namespaces, namespace F belonging to subnetwork 703, namespace G belonging to subnetwork 705, and namespace H belonging to subnetwork 707. The path this time is F,G,H,F. In this path, namespaces G and H are nested in F, but neither G nor H is nested in the other. As packet 709 begins traveling via the path, it is in namespace F and contains only the message and the inner header, with source and destination addresses in namespace F. Since the path goes by G and H, the packet 709 goes to encapsulator 711, which adds header 317' to make packet 713. Header 317' contains the address of decapsulator 715, which removes outer header 317' to produce packet 717. That in turn is routed to encapsulator 719, which adds outer header 317" to produce packet 721, with outer header 317" specifying decapsulator 723 as a destination. Decapsulator 723 strips header 317" to produce packet 725, which is identical with packet 709.

When there are non-nested namespaces, a given subnetwork must contain a decapsulator for each subnetwork which immediately follows the given subnetwork in the path. In that case, a path for a given packet may be established prior to transmitting the packet by dynamically setting the encapsulators for the packet's path to provide the addresses for the proper decapsulators prior to sending the packet. A path may also be established by including routing information from which the encapsulator can determine which decapsulator the packet should be directed to.

General Method of Namespace Tunneling

There is a general method of namespace tunneling which works for paths which have nested namespaces, sequential name spaces, or combinations of the two. In describing the method, it is useful to employ the term current header. The current header for a packet is the one used to route the packet in the namespace of the subnetwork that the packet is currently traveling in. Thus, when packet 721 is traveling in subnetwork 707, outer header 317" is the current header; when packet 721 is travelling in subnetwork 703, the inner header is the current header.

The method is the following:

When the packet is received in a given one of the subnetworks and a current header of the packet does not specify a destination in the given one of the subnetworks, add a new header to the packet and treat the new header as the current header. The new header specifies an exit destination where packets transferred via the path enter another one of the subnetworks.

Send the packet to the destination specified in the current header.

If the packet arrives at the exit destination, remove the current header and provide the packet to the other subnetwork.

In terms of the foregoing discussion, the encapsulator is located at the point at which the packet is received in the given subnetwork and the decapsulator is located at the exit destination.

Implementation of the Method

One way of setting up encapsulators and decapsulators to implement the foregoing method of namespace tunneling is shown in FIG. 8, which shows two entry points 815, 817 between a subnetwork 303 with a namespace A and a subnetwork 325, with a namespace B. In this arrangement, there are two entry points, A to B entry point 815, which permits packets arriving from subnetwork 303 to enter subnetwork 325, and B to A entry point 817, which does the reverse. Only entry point 815 will be described in detail, since entry point 817 works in exactly the same way, but in the reverse direction. Of course, a subnetwork with a given namespace must have entry points for all of the subnetworks with other namespaces to which the subnetwork with the given namespace either directly provides packets or from which the subnetwork with the given namespace directly receives packets.

The only packets which subnetwork 303 will route to decapsulator 803 is those for which the current outer header 317 contains the address in namespace A of decapsulator 803. Decapsulator 803 will always remove current outer header 317 and pass the packet minus current outer header 317 to encapsulator 805. What encapsulator 805 does depends on whether the header which follows the header that was stripped specifies source and destination addresses in namespace B. If the header does, encapsulator 805 does not add a new outer header 317 to the packet, but simply provides the packet to subnetwork 325, which transfers it to the destination specified in the header. If the header specifies addresses in a namespace other than namespace B, say namespace X, encapsulator 805 adds new outer header 317' with the address in namespace B of the decapsulator for the B to X entry point.

The first case is shown with packet 807, which has an inner header 306 that specifies a source and destination in namespace 325, and has an outer header 317 that specifies decapsulator 803. Decapsulator 803 strips outer header 317; encapsulator 805 reads inner header 306 and determines that the addresses in inner header 306 are in namespace B, so it simply provides packet 809 to subnetwork 325. It should be noted here that encapsulator 805 would have done the same thing had inner header 306 been an outer header 317 with addresses in namespace B.

The second case is shown with packet 811, which has an inner header 306' that specifies names in a namespace X of another subnetwork. As before, decapsulator 803 strips outer header 317; however, when encapsulator 805 reads inner header 306', it determines that it does not contain addresses in namespace B, so it adds a new outer header 317' which contains the address in namespace B of decapsulator 803 for the subnetwork with namespace X. Again, encapsulator 805 would have done the same thing had inner header 306' been an outer header 317 with addresses in namespace X.

As will be apparent from the foregoing discussion, the path that a given packet takes through the namespaces is determined by the destination addresses that the encapsulators put in the outer headers. If all of the encapsulators are under control of the same entity, that entity can determine the destination addresses and can thus define paths; otherwise, consensual arrangements for defining paths must be made among the users of the network.

Using Namespace Tunneling in Broadband Interactive Systems: FIGS. 1, 2, 4, and 5

As set forth in the Description of the Prior Art, the return channel broadband interactive systems such as that of Moura may be implemented using a packet network which is accessible by means of a public modem pool. Such a packet network is termed herein a public packet network. Examples of such packet networks are those belonging to on-line service providers. In such implementations, the public packet network and the packet network which implements the forward channel have different namespaces. As indicated above, the necessary names can be added to the namespace of the public packet network, but doing so substantially increases the cost and complexity of maintaining the namespace of the public packet network. Namespace tunneling may be used to solve this problem.

Figure 4:
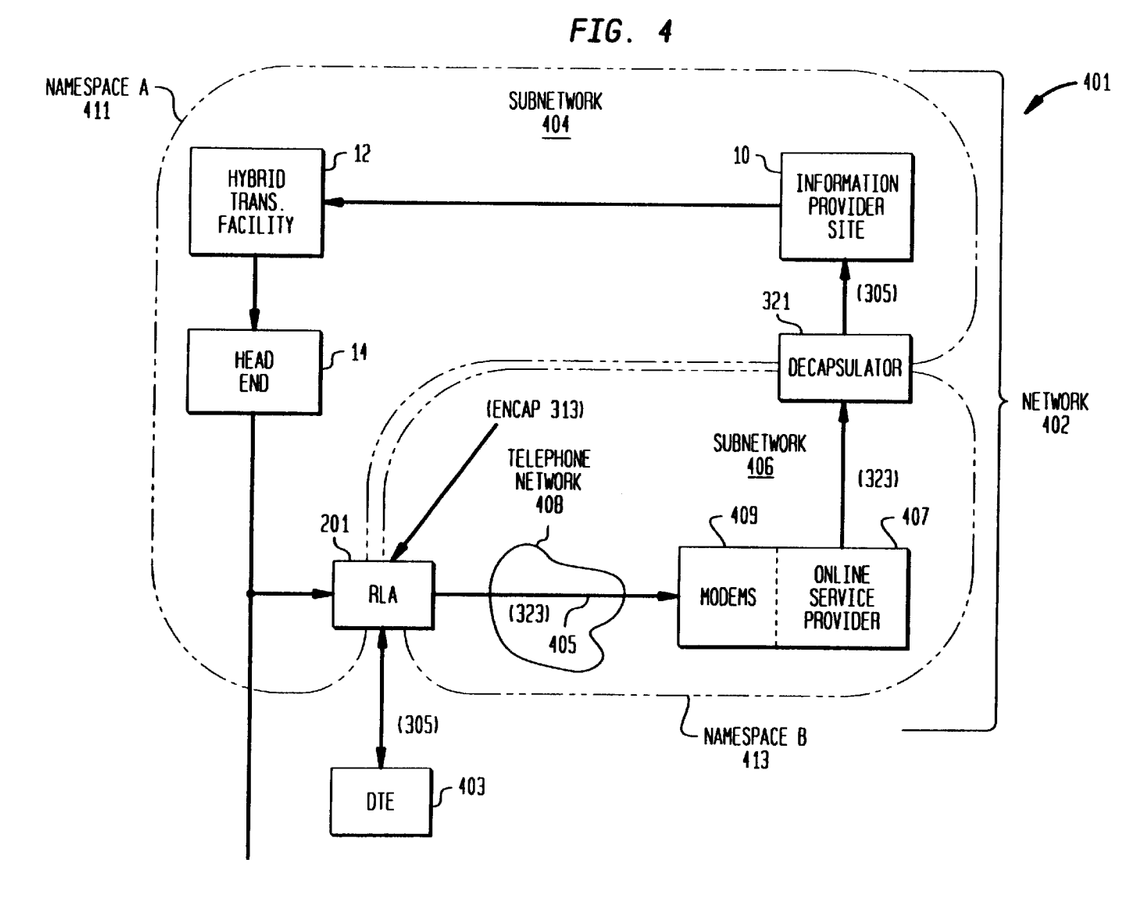
FIG. 4 shows how the invention would be implemented in the system of Moura.

FIG. 4 shows an implementation 401 of the system of Moura in which a public packet network belonging to an on-line service provider 407 provides the return channel. Implementation 401 forms a network 402 which has two subnetworks: subnetwork 404, which is the packet network of the forward channel, and subnetwork 406, which is the public packet network of the return channel. Subnetwork 404 has namespace A 411 and subnetwork 406 has namespace B 413. As set forth above, absent namespace tunneling, source and destination names from namespace A 411 must be added to namespace B 413 if RLA 201 is to be able to send responses to packets received in RLA 201 from subnetwork 404 to be returned via subnetwork 406 to a destination in subnetwork 404.

When namespace tunneling is used in system 401 of Mourra, RLA 201 functions not only as a node in subnetwork 404, but also as an encapsulator 313 for subnetwork 406. A device which has an address in namespace B and access to subnetwork 404 functions as a decapsulator 321. Operation of implementation 401 is as follows: as before, information provider site 10 provides digital packets with source and destination addresses in subnetwork 404 to hybrid transmission facility 12, which puts the packets into a form such that they can be broadcast on a TV channel from CATV head end 14. RLA 201 has an address in subnetwork 404 and monitors the packets transmitted on the TV channel. When one is transmitted with is addressed to RLA 201, RLA 201 converts it to the proper form for data terminal equipment 403 and provides it to data terminal equipment 403. Information in the packet, together with information from other packets, is used to create a display on data terminal equipment 403 to which the user of data terminal equipment 403 may respond. If the user does, data terminal equipment 403 sends a packet containing the response to RLA 201. The packet has the address of RLA 201 in subnetwork 404 as its source address and the address of information provider 10 in subnetwork 404 with which the user is presently interacting. In the terms used in the general discussion of namespace tunneling, the packet is a packet 305 which has not been encapsulated.

RLA 201 has access via public switched telephone network 408 to a public modem pool 409 belonging to on-line service provider 407. When the user of data terminal equipment 403 is interacting with information provider site 10, there is a circuit 405 in telephone network 408 between a modem in modem pool 409 and a telephone modem in RLA 201 (see hybrid interface 22 in FIG. 2). According to the standard practice of on-line service providers, at the time circuit 405 is established, on-line service provider 407 assigns the circuit a temporary address in subnetwork 406 and returns the temporary address to RLA 201, which stores the temporary address in its memory. RLA 201 further has stored in its memory the address in subnetwork 406 of decapsulator 321. This address may be built into RLA 201, or RLA 201 may have received the address in a message which it receives from either subnetwork 404 or subnetwork 406. For example, if system 401 is being used for telecommuting, information provider site 10 will typically belong to the user's employer, and that employer may have selected a preferred on-line service provider for the return channel. In such a case, the message with the address of decapsulators 321 would be sent from information provider site 10 via subnetwork 404.

When RLA 201 receives packet 305 from DTE 403, it adds an outer header 317 to packet 305 to create an encapsulated packet 323. Outer header 317 contains the temporary address associated with circuit 405 as the source address in subnetwork 406 an the address of decapsulator 321 as the destination address. RLA 201 then sends encapsulated packet 323 via telephone circuit 405 to on-line service provider 407. On-line service provider 407 accepts packet 323 because outer header 317 specifies a source and destination in namespace B 413 and forwards packet 323 to decapsulator 321, as specified in the destination address in outer header 317. Decapsulator 321 strips outer header 317 from encapsulated packet 323, leaving packet 305, which it it provides to subnetwork 404. The source address in inner header 307 is that of RLA 201 in subnetwork 404, and the destination address is that of information provider site 10, and so subnetwork 404 forwards the packet to information provider site 10.

As can be seen from the foregoing, when namespace tunneling is used in network 402, the only change that need be made in subnetwork 406 is the establishment of a decapsulator 321 at an address in subnetwork 406. There is no need to add addresses from subnetwork 404 to subnetwork 406 or to maintain any consistency between the networks beyond the address of decapsulator 321. Implementation of decapsulator 321 also poses no difficulty. The only packets which decapsulator 321 receives are those with an outer header 317 that specify the decapsulator in its destination address field, and all decapsulator 321 does is strip the outer header 317 from the packet and provide it to subnetwork 404.

Details of the Implementation of Encapsulator 313 in RLA 201: FIGS. 2, 5, 9 and 10

Figure 9:
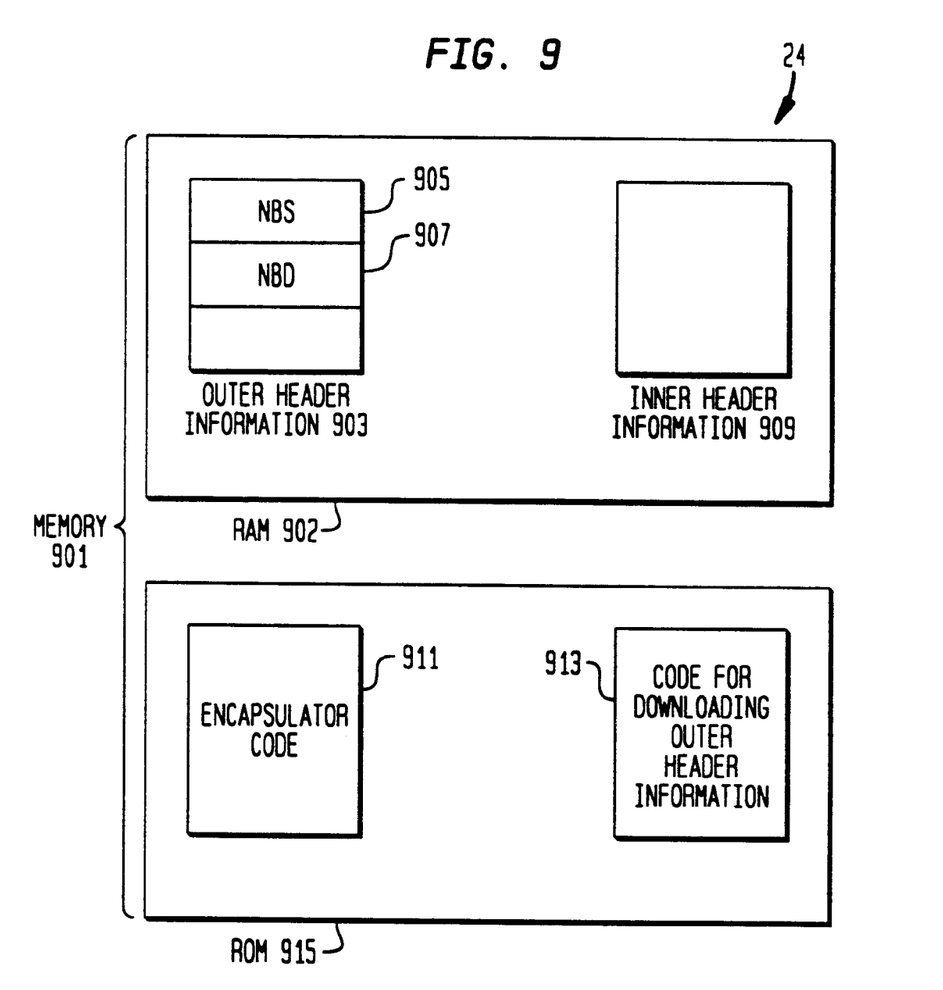
FIG. 9 is a detail of the Remote Link Adapter when it is configured to be an encapsulator.

FIG. 2 is from the Moura patent. The figure shows details of RLA 201 in the system of Moura. The three components of RLA 201 are user interface 20, which provides the connection to DTE 403, hybrid interface 22, which provides the connection via modems to the CATV channel and to the switched telephone network, and engine 24, which contains a microprocessor which controls the operation of RLA 201 and the ROM and RAM needed to store programs and data for microprocessor. When an encapsulator 313 is implemented in RLA 201, RLA 201 is modified as shown in FIG. 9. That Figure shows parts of the contents of memory 901 of engine 24. Memory 901 has two components: RAM 902 and ROM 915. In the implementation, RAM 902 contains outer header information 903 which the microprocessor uses to make outer header 903. Included in outer header information is namespace B source address 905 for the outer header and namespace B destination address 907 for the outer header. As explained above, address 905 is the temporary address given circuit 405 by on-line service provider 407 and address 907 is the address of decapsulator 321. ROM 915 contains the code necessary to implement the encapsulator. Encapsulator code 911 uses outer header information 903 to make encapsulated packets 323 from packets 305; downloading code 913 contains the code which downloads outer header information including the address 907 of decapsulator 321 from either subnetwork 404 or subnetwork 406. Decapsulator 321 may be similarly implemented by writing code for decapsulator 321 and executing the code in a processor at the decapsulator's address in subnetwork 406.

Figure 10:
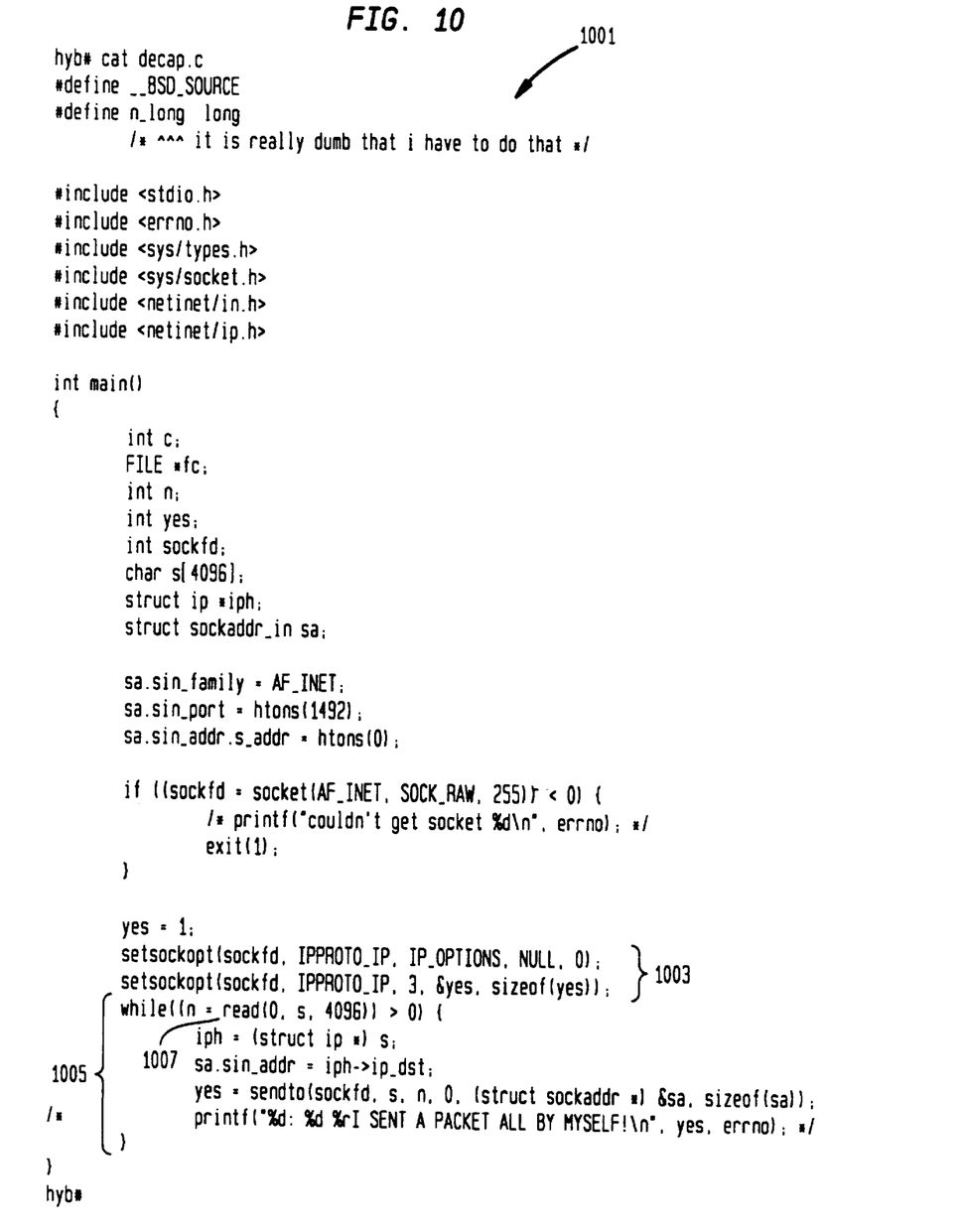
FIG. 10 is source code in the C language for an implementation of a decapsulator.

FIG. 10 shows code 1001 for a presently-preferred embodiment of decapsulator 321. In the computer system on which code 1001 is executed, a daemon (a process that is continually active) watches the destination addresses of packets as they pass on an ethernet. The daemon has a list of destination addresses for which it reads packets and it also can associate with each address a program which specifies how a packet directed to that address is to be processed. When the daemon sees a packet with a destination address which is on its list, it reads the packet, processes it as specified in the program, and sends it to the process corresponding to the destination. In the case of packets directed to the destination address at which the decapsulator resides, the program associated with that address removes outer header 317 from the packet.

The process executing Code 1001 provides the stripped packets it receives from the daemon to subnetwork 404. Normally, when an entity sends a packet, it writes its address into the packet as the packet's source address; here, however, the source address cannot be written over, because it is the address of the source in subnetwork 404. At 1003, the code sets options that prevent the source address from being overwritten. The while loop at 1005 simply reads the packets provided by the daemon on stdin and sends them unaltered to subnetwork 404.

Figure 5:
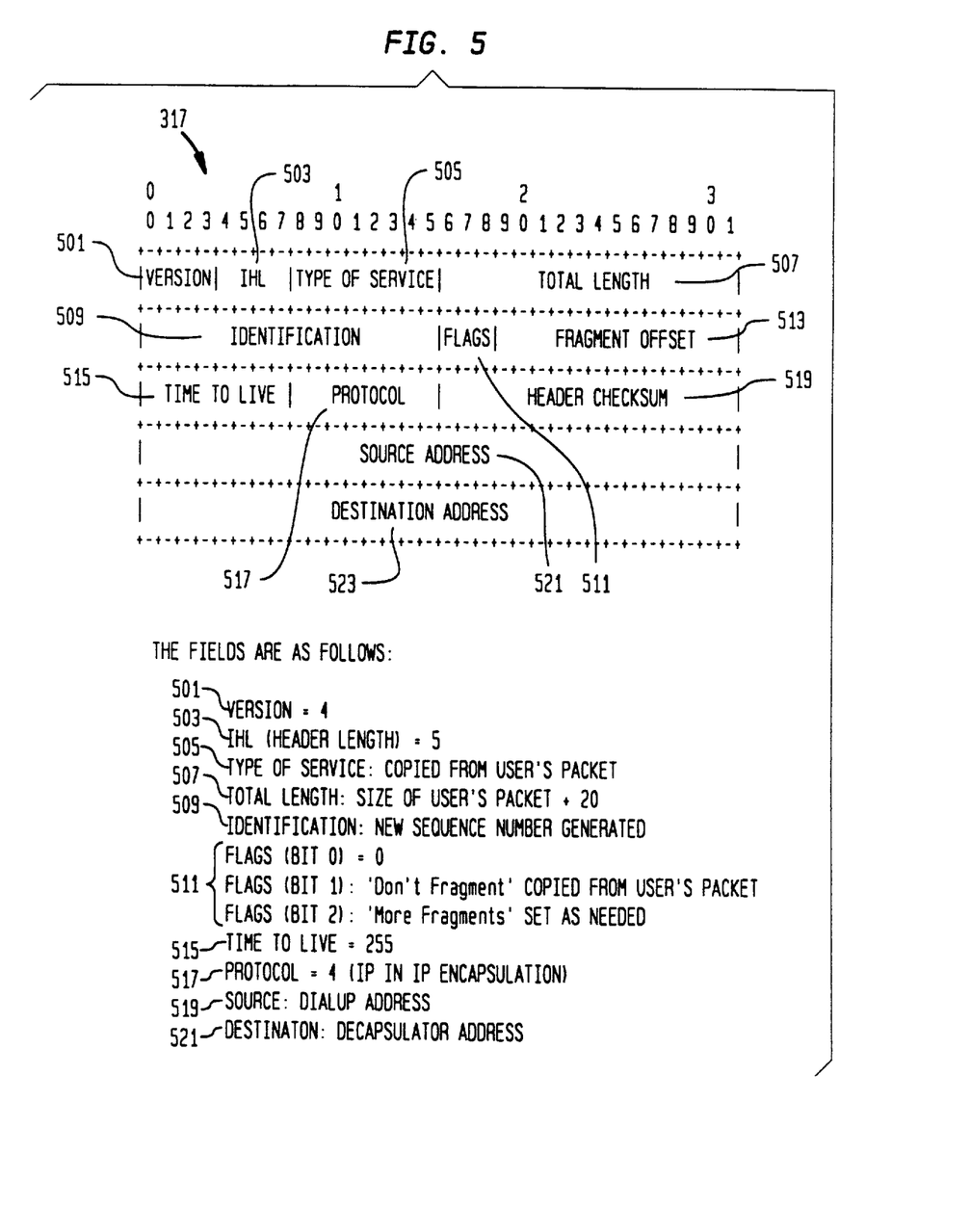
FIG. 5 shows outer header 317 in a preferred embodiment.

FIG. 5, finally, shows outer header 317 in a preferred environment. FIG. 5 also shows the significance of the fields. In the description of the fields, the "user's packets" is a packet 306; the value of Protocol field 517 identifies the data structure as an outer header 317; the header checksum is used for error detection in the header; and the dialup address is the temporary address assigned to circuit 405 by on-line service provider 407.

CONCLUSION

The foregoing Detailed Description has disclosed to those skilled in the arts to which the invention pertains how one may use namespace tunneling to transfer packets across packet networks that have subnetworks with different namespaces and has further disclosed how namespace tunneling may be used in the context of a system for providing interactive broadband service to residences to make it easier to use a public packet network as a return channel. The Detailed Description has further disclosed the best mode presently known to the inventor of implementing his invention. However, as will be immediately apparent to those skilled in the arts to which the invention pertains, the principles of the invention have many possible embodiments. For example, the preferred embodiment uses the IP tunneling protocol described by W. Simpson; however, any encapsulating protocol that permitted specification of source and destination addresses for the encapsulated packet in an outer header and provided that any other source and destination addresses in the encapsulated packet would be ignored would work also. There are further many ways of implementing encapsulators and decapsulators; all that is necessary is that the encapsulator be able to add an outer header with the address of a decapsulator and the decapsulator be able to strip the outer header and provide the packet to the next address space. Moreover, there are many different ways of providing the address of the next decapsulator to the encapsulator.

With regard to the use of namespace tunneling to make it easier to use a public packet network as a return channel in systems like those of Moura, it should be pointed out that tunneling can be used wherever the return channel and the forward channel have different namespaces. It is thus by no means limited to the system of Moura or even to interactive broad-band systems with asymmetrical return channels generally.

All of the above being the case, the foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the law.

What is claimed is:

1. A method for transferring data having a first destination in a first subnetwork via a path through a second subnetwork, the method comprising:

dynamically assigning a temporary address in the second subnetwork to the path, the temporary address not previously identified;

encapsulating the data with the temporary address and a second destination in the second subnetwork upon entry of the data into the second subnetwork;

sending the data to the second destination via the path;

decapsulating the data at the second destination to obtain the first destination; and sending the data to the first destination.

2. The method set forth in claim 1, further comprising the step of:

determinning the second destination prior to entry of the data into the second subnetwork.

3. The method set forth in claim 1, further comprising the step of:

providing the second destination by one of the first subnetwork and the second subnetwork.

4. The method set forth in claim 1, wherein:

when the data enters one of the first network or the second subnetwork, a destination in the one of the first subnetwork or the second subnetwork is never specified.

5. A data network for transferring data comprising:

a first subnetwork;

a second subnetwork comprising a path;

an encapsulator that receives data from a destination in the first subnetwork and encapsulates the data with a temporary address not previously identified and dynamically assigned to the path and a second destination in the second subnetwork, the data being sent to the second destination via the path; and a decapsulator that receives data at the second destination and decapsulates the data to obtain the first destination, the data being sent to the first destination from the second destination.

6. The data network set forth in claim 5, wherein the second destination is determined prior to entry of the data into the second subnetwork.

7. The data network set forth in claim 5, wherein the second destination is provided by one of the first subnetwork and the second subnetwork.

8. The data network set forth in claim 5, wherein:

when the data enters one of the first subnetwork or the second subnetwork, a destination in the one of the first subnetwork or the second subnetwork is never specified.

* * * * *